US009179803B1

(12) United States Patent
Benelli

(10) Patent No.: US 9,179,803 B1
(45) Date of Patent: Nov. 10, 2015

(54) TEMPERATURE CONTROL FOR PRE-ROAST FOWL

(71) Applicant: Brandon Paul Benelli, San Francisco, CA (US)

(72) Inventor: Brandon Paul Benelli, San Francisco, CA (US)

( * ) Notice: Subject to any disclaimer, the term of this patent is extended or adjusted under 35 U.S.C. 154(b) by 339 days.

(21) Appl. No.: 13/780,256

(22) Filed: Feb. 28, 2013

Related U.S. Application Data

(60) Provisional application No. 61/604,424, filed on Feb. 28, 2012.

(51) Int. Cl.
*A61F 7/00* (2006.01)
*A47J 43/18* (2006.01)

(52) U.S. Cl.
CPC ........................................ *A47J 43/18* (2013.01)

(58) Field of Classification Search
CPC ................ A61F 2007/0029; A61F 2007/0225; A61F 2007/0009; A61F 7/10; F25D 2400/26; F25D 2303/082

USPC .............. 99/483, 347, 426; 426/233; 62/529, 62/530; 165/10; 607/109
See application file for complete search history.

(56) References Cited

U.S. PATENT DOCUMENTS

| | | |
|---|---|---|
| 3,780,537 A | 12/1973 | Spencer |
| 4,530,220 A | 7/1985 | Nambu et al. |
| 5,368,093 A * | 11/1994 | Takehashi ....................... 165/46 |
| 5,400,617 A | 3/1995 | Ragonesi et al. |
| D403,074 S | 12/1998 | Piergiorgio et al. |
| D597,678 S | 8/2009 | Wagner |
| D627,076 S | 11/2010 | Matsuo et al. |
| 2009/0030491 A1 | 1/2009 | Justice-Black |
| 2009/0226581 A1 | 9/2009 | Ballenger |

* cited by examiner

*Primary Examiner* — Jianying Atkisson
(74) *Attorney, Agent, or Firm* — Patent Law Offices Michael E. Woods; Michael E. Woods

(57) ABSTRACT

A system and method pre-roasting preparation of a fowl to enhance desirability of breast portions while reducing risks of undercooking leg thigh portions. A flexible, contouring, temperature control pad is sized and shaped to selectively cover portions of a fowl that are to cook at a different rate than other non-covered portions. For example, the temperature control pad includes a cooling pad shaped to cover the breast portion while avoiding contact with the leg thigh portions.

12 Claims, 4 Drawing Sheets

TEMPERATURE CONTROL FOR PRE-ROAST FOWL

BACKGROUND OF THE INVENTION

The present invention relates generally to cooking systems and more particularly, but not exclusively, to pre-roasting preparation of a fowl (e.g., turkey, chicken, and the like).

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

It is a well-known challenge to evenly roast various portions of a fowl. For example, it is a well-known problem that a breast portion of a fowl cooks faster than leg thigh portions, which can result in overly dry breast portion when the leg thigh portions are sufficiently cooked or undercooked leg thigh portions when the breast portion is properly cooked. As undercooked fowl can pose a health risk, and overly dry breast portions are undesirable, the user is left with competing options. Conventional systems have employed cooking systems to address these problems and symptoms, including use of foil shields on the breast portion and/or frequent basting of the breast portion, among other solutions.

These solutions have not proven to be reliable, easy to use, and effective. What is needed is a system and method for pre-roasting preparation of a fowl to enhance desirability of breast portions while reducing risks of undercooking leg thigh portions.

BRIEF SUMMARY OF THE INVENTION

Disclosed is a system and method pre-roasting preparation of a fowl to enhance desirability of breast portions while reducing risks of undercooking leg thigh portions. A flexible, contouring, temperature control pad is sized and shaped to selectively cover portions of a fowl that are to cook at a different rate than other non-covered portions. For example, the temperature control pad includes a cooling pad shaped to cover the breast portion while avoiding contact with the leg thigh portions and creates a desired temperature variance between the portions that are to cook at different rates.

The following summary of the invention is provided to facilitate an understanding of some of technical features related to uniform roasting of a fowl, and is not intended to be a full description of the present invention. A full appreciation of the various aspects of the invention can be gained by taking the entire specification, claims, drawings, and abstract as a whole. The present invention is applicable to products other than fowl and to selective heating and other uses other than selective temperature control.

A temperature control pad for a non-room temperature fowl carcass having a breast portion defined between a pair of lateral wing joints, a body portion defined between a pair of lateral leg joints, and a posterior opening into a body organ cavity on an opposite end of the fowl carcass relative to a neck opening into the body organ cavity wherein the fowl carcass is disposed within a room temperature environment, including a first shaped flexible planar body including a pair of thermally conductive outer walls closed about a perimeter sealing an inner first shaped body cavity, the inner first shaped body cavity defining an elongate central portion having a central portion width less than a width between the pair of lateral leg joints with the central portion configured to overlie and cover the body portion and a pair of lateral lobes coupled to the elongate central portion and having a collective lobe width for the pair of lateral lobes less than a width between the pair of lateral wing joints with the pair of lateral lobes defining a gap region between the lateral lobes, the pair of lateral lobes configured to drape, overlie, and cover the breast portion while the gap region exposes an area proximate the neck opening when the pair of lateral lobes cover the breast portion; and a flexible thermal material disposed in the inner first shaped body cavity, the flexible thermal material having a set of thermal properties configured to maintain a temperature difference between a breast temperature of the breast portion and an other temperature of a non-breast non-body portion of the fowl carcass for at least 30 minutes with the other temperature closer to room temperature than the breast temperature during the at least 30 minutes.

A method of slowing a temperature change of a breast portion of a fowl carcass at a temperature other than room temperature, the fowl carcass having the breast portion defined between a pair of lateral wing joints, a body portion defined between a pair of lateral leg joints, and a posterior opening into a body organ cavity on an opposite end of the fowl carcass relative to a neck opening into the body organ cavity, the method including a) disposing the fowl carcass at a location at room temperature, the fowl carcass having a carcass temperature at an initial temperature other than room temperature; and b) draping a temperature control pad over the breast portion having a breast temperature without contacting any wing portions or leg portions of the fowl carcass, the temperature control pad having a flexible body at a pad temperature other than room temperature and the breast temperature initially at the carcass temperature; and thereafter c) creating a variable temperature gradient between the breast temperature and a temperature of one or more non-breast portions of the fowl carcass using the temperature control pad; and d) maintaining the variable temperature gradient for at least 30 minutes as the temperature of the one or more non-breast portions of the fowl carcass moves toward room temperature faster than the breast temperature.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method for pre-roasting preparation of a fowl to enhance desirability of breast portions while reducing risks of undercooking leg thigh portions. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
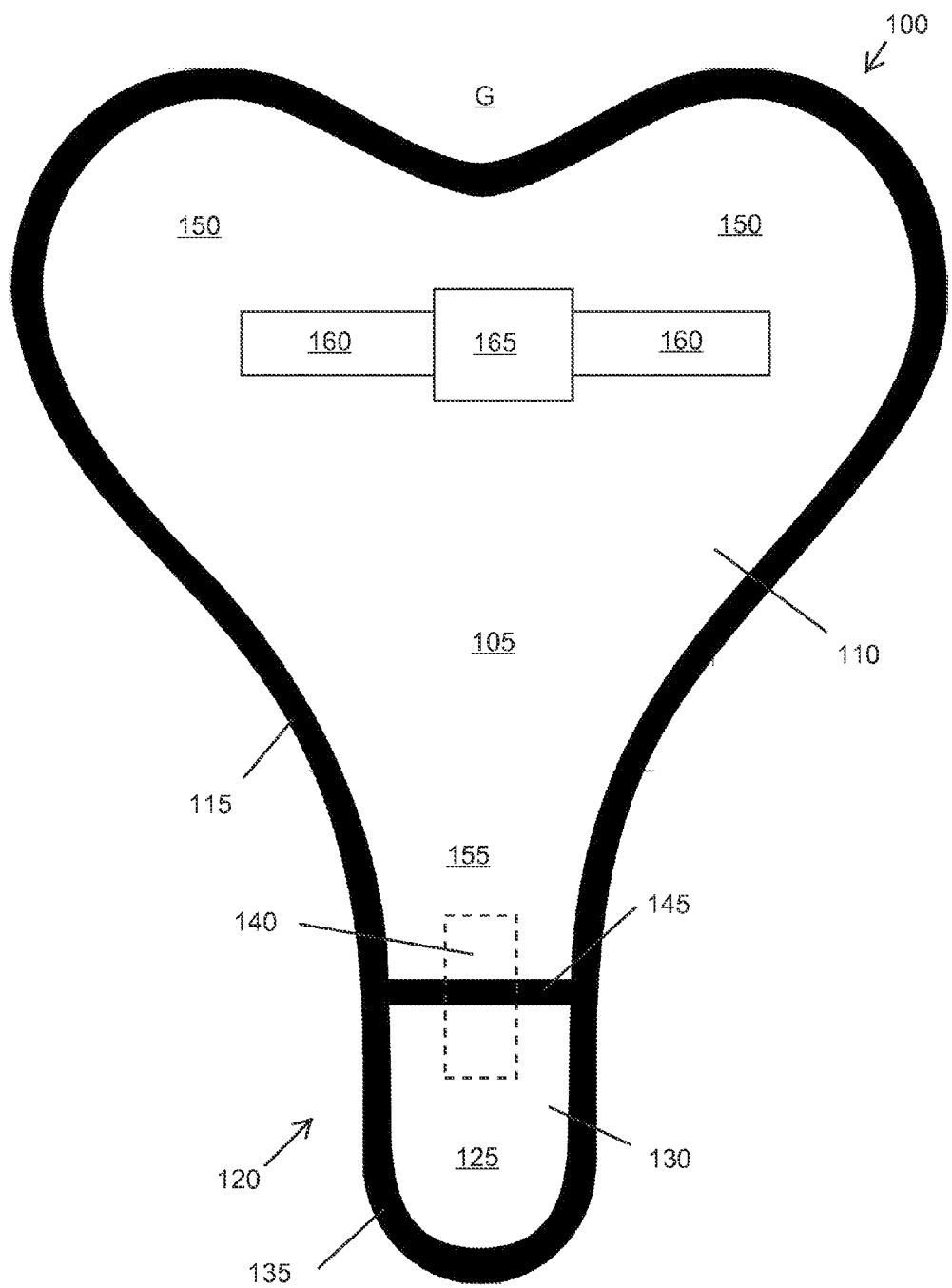
FIG. 1 illustrates a top view of a temperature control pad.
Figure 2:
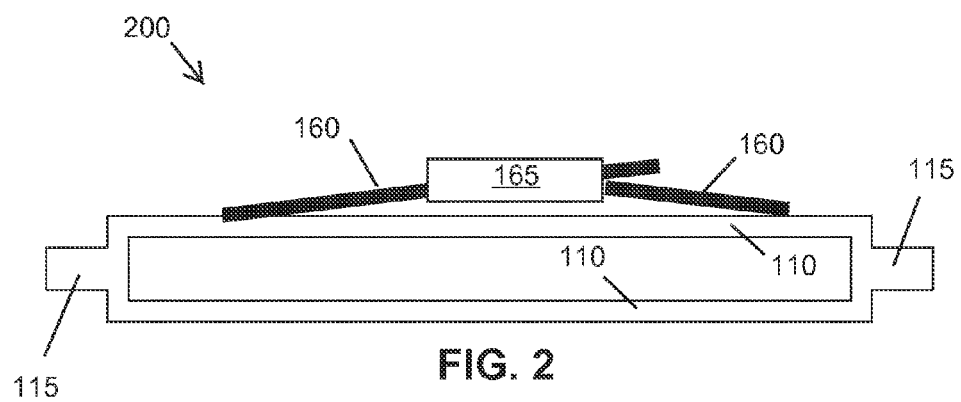
FIG. 2 illustrates a front view of the temperature control pad of FIG. 1.
Figure 3:
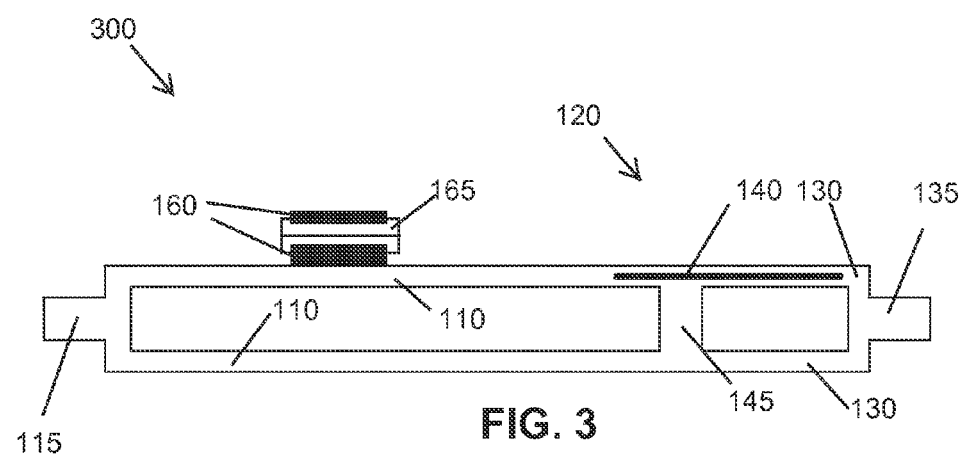
FIG. 3 illustrates a side view of the temperature control pad of FIG. 1.
Figure 4:
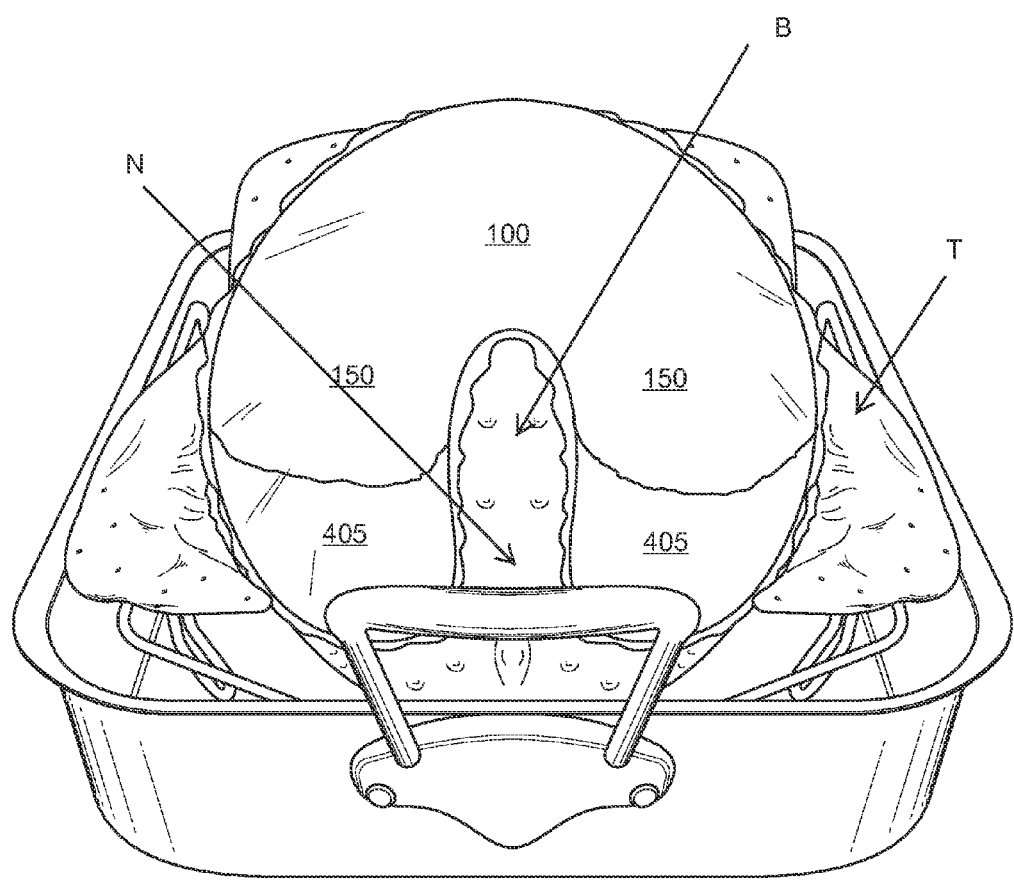
FIG. 4 illustrates an installation of the temperature control pad on a turkey being prepared for roasting.
Figure 5:
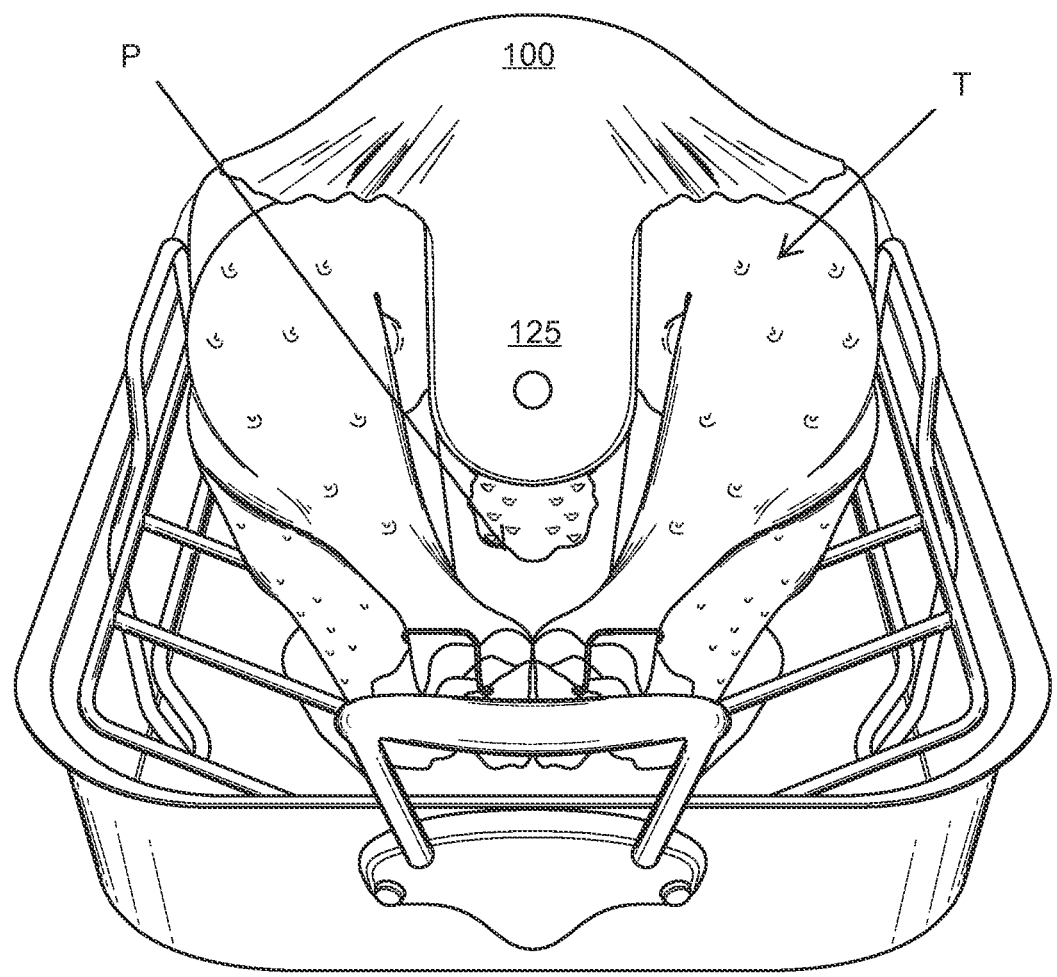
FIG. 5 illustrates a rear view of the installation of FIG. 4.

FIG. 1 illustrates a top plan view of a temperature control pad 100, FIG. 2 illustrates a front elevation view of a cross-section 200 of pad 100, and FIG. 3 illustrates a side elevation view of a cross-section 300 of pad 100. FIG. 4 illustrates an installation of pad 100 on a turkey T being prepared for roasting and FIG. 5 illustrates a rear view of the installation of FIG. 4. Pad 100 includes a first shaped body 105 having a pair of layers 110 joined together with a sealed perimeter 115 to define a first cavity between layers 110. In a preferred embodiment, an optional engagement system 120 includes a second shaped body 125 moveably coupled to first shaped body 105. Second shaped body 125 also includes a pair of layers 130 joined together with a sealed perimeter 135 to define a second cavity between layers 130. Optional engagement system 120 preferably includes a memory element 140, with memory element 140 straddling a hinging portion 145. Hinging portion 145 moveably joins first shaped body 105 to second shaped body 125, allowing second shaped body 125 to be bent (and/or unbent) relative to first shaped body 105 as further described herein.

First shaped body 105 is specially shaped with a pair of lobes 150 joined to a narrowed central portion 155. Lobes 150 are designed to substantially drape, cover, and conform to a breast portion of a fowl (e.g., turkey, chicken, duck, game bird, and the like) and central portion 155 is designed to cover a portion of the fowl in between the leg thigh portions. Some embodiments may include sizing control for lobes 150, such as, for example, a pair of straps 160 and a buckle 165. Straps 160 and buckle 165 permit a distance between lobes 150 to be changed (e.g., attaching ends of straps 160 to lobes 150 and using buckle 165 to control a distance between such attachment points), which can increase or decrease an area of the fowl breast portion covered by lobes 150. As the size of the breast portion changes, an adjustable feature has advantages. Other solutions include providing a set of pads 100, each having a different profile and perimeter shape so that the proper fit may be chosen. Lobes 150 include a gap region G disposed therein that helps to facilitate the mapping of a 2 dimensional shape of pad 100 to a 3 dimensional contour shape of the curved breast portion. While some implementations may exclude gap G and provide a top portion of pad 100 that is straight and linear without indentation, it could be less desirable as that portion that would "fill in" gap region G would bunch together and not suitably drape to allow desired surface area contact.

The first cavity of first shaped body 105 is filled with a material with a relatively high thermal capacity, which may be for retaining low temperature, retaining high temperature, or both, depending upon intended use and period over which the desired temperature variance is to be maintained. This material may be a solid, a gel, a liquid, a gas, or combination thereof, and most preferably is non-toxic and completely safe for use around foodstuff in case of leakage or damage to pad 100. Preferably both the pad and pad with the material installed is flexible and shape conforming (for cooling implementations, pad 100 is preferably flexible when cooled to an installation temperature for draping over the fowl carcass), whether the material is in solid, liquid, or gas form, to allow pad 100 to properly drape and match the contours of the breast portion and body portion (between the leg thigh portions). In some implementations, pad 100 includes a plastic sack of refrigerant gel (e.g., non-liquefying gel) or liquid having a high enthalpy of fusion similar to that of water (–80 cal/g).

In a first implementation, pad 100 is designed to selectively cool the breast portion without cooling the leg thigh portions. This is achieved by properly sizing lobes 150 and central portion 155 so that the breast portion is maximally covered without any part of central portion 155 touching the leg thigh portions. The material in the first cavity is cooled to the desired temperature. A conventional pre-roasting procedure is to store a pre-roast fowl in a refrigerated container until about one hour before roasting is to start. During that pre-roast hour, the fowl is removed from the refrigerated container and stored at "room temperature" which allows the temperature to rise. In the conventional method, the leg thigh portions and the breast portion are all brought towards room temperature, defined herein as around 68° F. in a range of 60-80 degrees.

However with use of an embodiment of the present invention, pad 100 is cooled and then subsequently placed on the fowl and positioned as described with lobes 150 over the breast portion and central portion 155 placed between the leg thigh portions. The material in the first cavity maintains the breast portion at the desired temperature variance vis-à-vis the leg thigh portions (most preferably the material has a thermal capacity sufficient to maintain the desired temperature variance for the entire desired pre-roast period (e.g., the one hour or so)). Pad 100 is removed and the fowl is then roasted in conventional fashion. However the actual roasting is different and achieves a different and superior result because the breast portion cooks more slowly than the leg thigh portions since it began the roasting cycle at a substantially lower temperature. In this way the breast portion will not be overcooked when the leg thigh portions are fully cooked nor will the leg thigh portions be undercooked when the breast portion is properly cooked.

In a second implementation, after the fowl has roasted, sometimes it is the case that the fowl is not to be carved and otherwise prepared for consumption at the conclusion of the roasting cycle. In such a situation, it would be desirable if it were possible to help retain/maintain the breast portion at an elevated temperature until the proper time for preparation. When the material in the first cavity is adapted for retaining elevated temperature, it is an advantage to heat the material and to apply heated pad 100 to the fowl as described above. In this way, the desired elevated temperature of the breast portion is maintained.

A third implementation employs a material within the first cavity that offers both the desired low temperature and the high temperature performance. In this way pad 100 offers either or both useful functions from both the first and the second implementations.

Because it is used with fowl, and in the preferred embodiments used with both uncooked and cooked fowl, it is desirable that the layers 110 and layers 130 be made of a polymer with high molecular mass, such as an organic synthetic polymer such as a plastic or the like so that they may be easily cleaned, reused, and repeatedly subjected to cooling (e.g., freezer compartment, ice bath, or the like) and/or heating (e.g., microwave, heat bath, or the like) cycles. Desirably the material is thin and flexible allowing its shape, including the thermal control material disposed therebetween, to drape over the breast and body portions and conform closely to the breast/body portion shape to optimize surface area contact with those portions to be temperature controlled by pad 100.

One suitable material for the layers may include polymerized siloxanes (polysiloxane) sometimes referred to as silicone configured to meet the structural (e.g., flexible) and thermal (e.g., freeze) properties described herein while performing the desired functions. It being understood that the structure of the layers and the particular thermal material(s) disposed therebetween form a thermal transfer system rather than a thermal insulating system. Pad 100 either cools the breast portion before roasting or warms the breast portion after roasting and thus heat is transferred into pad 100 for cooling and out of pad for warming. The layers are thermally conductive and the thermal material, while being sufficiently flexible, is also thermally capacitive and configured to continue to cool/warm the breast portion for at least 30 minutes (more preferably an hour or more) when the pre-roasted/post-roasted fowl carcass (respectively) is placed at room temperature. Preferably before application, the thermal material is at freezer temperature (0 to −10) ° F. or lower for cooling and the thermal material is at warming temperature (140 to 150° F. or higher for warming.

In some embodiments, particularly for fowl with relatively large breast portions, there may be significant roundness and sloped areas that a weight of lobes 150 may tend to cause pad 100 to slide off of the fowl, particularly when the fowl is moved from one location to another. One solution is to use optional engagement system 120 to help fix pad 100 into proper position to resist such displacement. A fowl carcass prepared for roasting typically includes a pair of openings, a neck opening near the breast portion and an opposing posterior opening P between the leg thigh portions. Engagement system 120 is designed to hook into or otherwise interface to the posterior opening to resist the weight of lobes 150 causing pad 100 to slid down towards the neck opening.

A simple solution for engagement system 120 is to employ memory element 140 (e.g., metal, plastic, composite, or the like) that may be formed into a hook or other retaining shape. In some implementations, memory element is reformable/rebendable (without destructive deformation) so that it may be flat and extend over the posterior opening or be bent into a hook shape and extend through the posterior opening and grip the inside cavity of the fowl carcass. In other implementations, memory element 140 is pre-shaped into a hook and may be straightened or expanded to aid in engaging the posterior opening and then return to the pinching/hooking pre-shaped form to grip the fowl carcass. Memory element 140 is made of a material consistent with the intended uses, for example if intended that pad 100 include a microwave-induced warming mode for after-roast elevated temperature maintenance, then memory element 140 is not made of metal. Memory element 140 may not be necessary in all implementations. Further, memory element 140 may not be required to be a discrete element and the desired memory functions may be integrated or otherwise incorporated into layers 130.

In FIG. 4, pad 100 is shown with lobes 150 deployed over a breast portion of turkey T having a neck portion N. As noted above, it is preferable for pad 100 to be flexible and shape conforming and able to be sized appropriately for varying sizes and dimensions of turkey T. For example, it would be advantageous for lobes 150 to be extended (e.g., folded over or the like) to drape over a larger portion of the breast portion, for example as shown as a pair of extended lobes 405. Lobes 150 and extended lobes 405 reflect alternative implementations, a single design including one set or the other. Note that various fowl have various contours with "steep" sloping breast portions and others have shallow sloping breast portions. Properly sized lobes cover just the breast portions and avoid other portions. In commercial or high-capacity kitchens that often roast many birds, there is typically conformity in the size and shapes of fowl that are concurrently roasted, including multiple session roasting. Parameters of pad 100 may be advantageously sized in such a scenario to best meet the size/contours of the "standard" fowl used in these roasting sessions.

As shown in FIG. 4, the lobes cover both a center region of the breast portion defined between the pair of lateral wing joints and drape over curved contours of the upper region of the breast portion. Gap region G illustrated in FIG. 1 may preferably expose a portion of the breast bone and a skin portion covering the neck opening. As many persons may fill the body organ cavity accessed through the neck opening and/or the posterior opening with stuffing, and that stuffing may include food components requiring adequate cooking temperature, gap region G enables the stuffing to come to room temperature and be better able to be cooked thoroughly while the surrounding breast portion is desirably cooled.

In FIG. 5, pad 100 is shown with second shaped body 125 formed into a "hook" and engaged with posterior opening P of turkey T. The hook retains the lobes (e.g., lobes 150 or extended lobes 405) in position next to and overlying breast portions of turkey T.

The system and methods above has been described in general terms as an aid to understanding details of preferred embodiments of the present invention. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A temperature control pad for a non-room temperature fowl carcass having a breast portion defined between a pair of lateral wing joints, a body portion defined between a pair of lateral leg joints, and a posterior opening into a body organ cavity on an opposite end of the fowl carcass relative to a neck opening into the body organ cavity wherein the fowl carcass is disposed within a room temperature environment, comprising:

a first shaped flexible planar body including a pair of thermally conductive outer walls closed about a perimeter sealing an inner first shaped body cavity, said inner first shaped body cavity defining an elongate central portion having a central portion width less than a width between the pair of lateral leg joints with said central portion configured to overlie and cover the body portion and a pair of lateral lobes coupled to said elongate central portion and having a collective lobe width for said pair of lateral lobes less than a width between the pair of lateral wing joints with said pair of lateral lobes defining a gap region between said lateral lobes, said pair of lateral lobes configured to drape, overlie, and cover the breast portion while the gap region exposes an area proximate the neck opening when said pair of lateral lobes cover the breast portion; and a flexible thermal material disposed in said inner first shaped body cavity, said flexible thermal material having a set of thermal properties configured to maintain a temperature difference between a breast temperature of the breast portion and an other temperature of a non-breast non-body portion of the fowl carcass for at least 30 minutes with said other temperature closer to room temperature than said breast temperature during said at least 30 minutes; further comprising a second shaped flexible body moveably coupled to said first shaped flexible body proximate said elongate central portion, said second shaped flexible body including a memory material configured to be repeatably bent into a hooking structure and straightened into a non-hooking structure, said second shaped flexible body engaged with the posterior opening when shaped into said hooking structure, when said pair of lateral lobes are disposed overlying the breast portion, and when said elongate central portion overlies the body portion.

2. A temperature control pad for a non-room temperature fowl carcass having a breast portion defined between a pair of lateral wing joints, a body portion defined between a pair of lateral leg joints, and a posterior opening into a body organ cavity on an opposite end of the fowl carcass relative to a neck opening into the body organ cavity wherein the fowl carcass is disposed within a room temperature environment, comprising:

a first shaped flexible planar body including a pair of thermally conductive outer walls closed about a perimeter sealing an inner first shaped body cavity, said inner first shaped body cavity defining an elongate central portion having a central portion width less than a width between the pair of lateral leg joints with said central portion configured to overlie and cover the body portion and a pair of lateral lobes coupled to said elongate central portion and having a collective lobe width for said pair of lateral lobes less than a width between the pair of lateral wing joints with said pair of lateral lobes defining a gap region between said lateral lobes, said pair of lateral lobes configured to drape, overlie, and cover the breast portion while the gap region exposes an area proximate the neck opening when said pair of lateral lobes cover the breast portion; and a flexible thermal material disposed in said inner first shaped body cavity, said flexible thermal material having a set of thermal properties configured to maintain a temperature difference between a breast temperature of the breast portion and an other temperature of a non-breast non-body portion of the fowl carcass for at least 30 minutes with said other temperature closer to room temperature than said breast temperature during said at least 30 minutes wherein said pair of lateral lobes includes a lobe length extending from said elongate central portion and further comprising a lobe configuration control coupled to said lateral lobes, said lobe configuration control adjusting at least one of said collective lobe width or said lobe length.

3. The temperature control pad of claim 1 wherein said pair of lateral lobes includes a lobe length extending from said elongate central portion and further comprising a lobe configuration control coupled to said lateral lobes, said lobe configuration control adjusting at least one of said collective lobe width or said lobe length.

4. A temperature control pad for a non-room temperature fowl carcass having a breast portion defined between a pair of lateral wing joints, a body portion defined between a pair of lateral leg joints, and a posterior opening into a body organ cavity on an opposite end of the fowl carcass relative to a neck opening into the body organ cavity wherein the fowl carcass is disposed within a room temperature environment, comprising:
   a first shaped flexible planar body including a pair of thermally conductive outer walls closed about a perimeter sealing an inner first shaped body cavity, said inner first shaped body cavity defining an elongate central portion having a central portion width less than a width between the pair of lateral leg joints with said central portion configured to overlie and cover the body portion and a pair of lateral lobes coupled to said elongate central portion and having a collective lobe width for said pair of lateral lobes less than a width between the pair of lateral wing joints with said pair of lateral lobes defining a gap region between said lateral lobes, said pair of lateral lobes configured to drape, overlie, and cover the breast portion while the gap region exposes an area proximate the neck opening when said pair of lateral lobes cover the breast portion; and
   a flexible thermal material disposed in said inner first shaped body cavity, said flexible thermal material having a set of thermal properties configured to maintain a temperature difference between a breast temperature of the breast portion and an other temperature of a non-breast non-body portion of the fowl carcass for at least 30 minutes with said other temperature closer to room temperature than said breast temperature during said at least 30 minutes wherein the non-room temperature fowl carcass is below room temperature and wherein said thermal material is configured to be coolable below room temperature immediately before an installation of said first shaped flexible planar body on the breast portion, said first shaped flexible planar body establishing a variable temperature gradient between said breast temperature and a second temperature of one or more non-breast non-body portions of the fowl carcass with said breast temperature below said second temperature, said temperature gradient maintained for at least 30 minutes while said second temperature rises toward room temperature.

5. The temperature control pad of claim 1 wherein the non-room temperature fowl carcass is below room temperature and wherein said thermal material is configured to be coolable below room temperature immediately before an installation of said first shaped flexible planar body on the breast portion, said first shaped flexible planar body establishing a variable temperature gradient between said breast temperature and a second temperature of one or more non-breast non-body portions of the fowl carcass with said breast temperature below said second temperature, said temperature gradient maintained for at least 30 minutes while said second temperature rises toward room temperature.

6. The temperature control pad of claim 3 wherein the non-room temperature fowl carcass is below room temperature and wherein said thermal material is configured to be coolable below room temperature immediately before an installation of said first shaped flexible planar body on the breast portion, said first shaped flexible planar body establishing a variable temperature gradient between said breast temperature and a second temperature of one or more non-breast non-body portions of the fowl carcass with said breast temperature below said second temperature, said temperature gradient maintained for at least 30 minutes while said second temperature rises toward room temperature.

7. A temperature control pad for a non-room temperature fowl carcass having a breast portion defined between a pair of lateral wing joints, a body portion defined between a pair of lateral leg joints, and a posterior opening into a body organ cavity on an opposite end of the fowl carcass relative to a neck opening into the body organ cavity wherein the fowl carcass is disposed within a room temperature environment, comprising:
   a first shaped flexible planar body including a pair of thermally conductive outer walls closed about a perimeter sealing an inner first shaped body cavity, said inner first shaped body cavity defining an elongate central portion having a central portion width less than a width between the pair of lateral leg joints with said central portion configured to overlie and cover the body portion and a pair of lateral lobes coupled to said elongate central portion and having a collective lobe width for said pair of lateral lobes less than a width between the pair of lateral wing joints with said pair of lateral lobes defining a gap region between said lateral lobes, said pair of lateral lobes configured to drape, overlie, and cover the breast portion while the gap region exposes an area proximate the neck opening when said pair of lateral lobes cover the breast portion; and
   a flexible thermal material disposed in said inner first shaped body cavity, said flexible thermal material having a set of thermal properties configured to maintain a temperature difference between a breast temperature of the breast portion and an other temperature of a non-breast non-body portion of the fowl carcass for at least 30 minutes with said other temperature closer to room temperature than said breast temperature during said at least 30 minutes wherein the non-room temperature fowl carcass is above room temperature and wherein said thermal material is configured to be heatable above room temperature immediately before an installation of said first shaped flexible planar body on the breast portion, said first shaped flexible planar body establishing a variable temperature gradient between said breast temperature and a second temperature of one or more non-breast non-body portions of the fowl carcass with said breast temperature above said second temperature, said temperature gradient maintained for at least 30 minutes while said second temperature declines toward room temperature.

8. The temperature control pad of claim 1 wherein the non-room temperature fowl carcass is above room temperature and wherein said thermal material is configured to be heatable above room temperature immediately before an installation of said first shaped flexible planar body on the breast portion, said first shaped flexible planar body establishing a variable temperature gradient between said breast temperature and a second temperature of one or more non-breast non-body portions of the fowl carcass with said breast temperature above said second temperature, said temperature gradient maintained for at least 30 minutes while said second temperature declines toward room temperature.

9. The temperature control pad of claim 3 wherein the non-room temperature fowl carcass is above room temperature and wherein said thermal material is configured to be heatable above room temperature immediately before an installation of said first shaped flexible planar body on the breast portion, said first shaped flexible planar body establishing a variable temperature gradient between said breast temperature and a second temperature of one or more non-breast non-body portions of the fowl carcass with said breast temperature above said second temperature, said temperature gradient maintained for at least 30 minutes while said second temperature declines toward room temperature.

10. A temperature control pad for a non-room temperature fowl carcass having a breast portion defined between a pair of lateral wing joints, a body portion defined between a pair of lateral leg joints, and a posterior opening into a body organ cavity on an opposite end of the fowl carcass relative to a neck opening into the body organ cavity wherein the fowl carcass is disposed within a room temperature environment, comprising:
   a first shaped flexible planar body including a pair of thermally conductive outer walls closed about a perimeter sealing an inner first shaped body cavity, said inner first shaped body cavity defining an elongate central portion having a central portion width less than a width between the pair of lateral leg joints with said central portion configured to overlie and cover the body portion and a pair of lateral lobes coupled to said elongate central portion and having a collective lobe width for said pair of lateral lobes less than a width between the pair of lateral wing joints with said pair of lateral lobes defining a gap region between said lateral lobes, said pair of lateral lobes configured to drape, overlie, and cover the breast portion while the gap region exposes an area proximate the neck opening when said pair of lateral lobes cover the breast portion; and
   a flexible thermal material disposed in said inner first shaped body cavity, said flexible thermal material having a set of thermal properties configured to maintain a temperature difference between a breast temperature of the breast portion and an other temperature of a non-breast non-body portion of the fowl carcass for at least 30 minutes with said other temperature closer to room temperature than said breast temperature during said at least 30 minutes wherein said thermal material is configured to be both coolable below room temperature immediately before an installation of said first shaped flexible planar body on the breast portion when the non-room temperature fowl carcass is below room temperature, said first shaped flexible planar body establishing a variable temperature gradient between said breast temperature and a second temperature of one or more non-breast non-body portions of the fowl carcass with said breast temperature below said second temperature, said temperature gradient maintained for at least 30 minutes while said second temperature rises toward room temperature and heatable above room temperature immediately before an installation of said first shaped flexible planar body on the breast portion when the non-room temperature fowl carcass is above room temperature, said first shaped flexible planar body establishing a variable temperature gradient between said breast temperature and a second temperature of one or more non-breast non-body portions of the fowl carcass with said breast temperature above said second temperature, said temperature gradient maintained for at least 30 minutes while said second temperature declines toward room temperature.

11. The temperature control pad of claim 1 wherein said thermal material is configured to be both coolable below room temperature immediately before an installation of said first shaped flexible planar body on the breast portion when the non-room temperature fowl carcass is below room temperature, said first shaped flexible planar body establishing a variable temperature gradient between said breast temperature and a second temperature of one or more non-breast non-body portions of the fowl carcass with said breast temperature below said second temperature, said temperature gradient maintained for at least 30 minutes while said second temperature rises toward room temperature and heatable above room temperature immediately before an installation of said first shaped flexible planar body on the breast portion when the non-room temperature fowl carcass is above room temperature, said first shaped flexible planar body establishing a variable temperature gradient between said breast temperature and a second temperature of one or more non-breast non-body portions of the fowl carcass with said breast temperature above said second temperature, said temperature gradient maintained for at least 30 minutes while said second temperature declines toward room temperature.

12. The temperature control pad of claim 3 wherein said thermal material is configured to be both coolable below room temperature immediately before an installation of said first shaped flexible planar body on the breast portion when the non-room temperature fowl carcass is below room temperature, said first shaped flexible planar body establishing a variable temperature gradient between said breast temperature and a second temperature of one or more non-breast non-body portions of the fowl carcass with said breast temperature below said second temperature, said temperature gradient maintained for at least 30 minutes while said second temperature rises toward room temperature and heatable above room temperature immediately before an installation of said first shaped flexible planar body on the breast portion when the non-room temperature fowl carcass is above room temperature, said first shaped flexible planar body establishing a variable temperature gradient between said breast temperature and a second temperature of one or more non-breast non-body portions of the fowl carcass with said breast temperature above said second temperature, said temperature gradient maintained for at least 30 minutes while said second temperature declines toward room temperature.

* * * * *